(12) United States Patent
Matsuda et al.

(10) Patent No.: US 6,774,604 B2
(45) Date of Patent: Aug. 10, 2004

(54) POWER CONTROL CIRCUIT, ELECTRONIC INSTRUMENT, AND CHARGING METHOD

(75) Inventors: Kuniaki Matsuda, Sapporo (JP); Shun Oshita, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/201,779

(22) Filed: Jul. 25, 2002

(65) Prior Publication Data
US 2003/0030412 A1 Feb. 13, 2003

(30) Foreign Application Priority Data
Aug. 10, 2001 (JP) ........................................ 2001-243535

(51) Int. Cl.$^7$ ........................ H01M 10/44; H01M 10/46
(52) U.S. Cl. ........................................ 320/110; 320/114
(58) Field of Search ................................ 320/103, 110, 320/112, 114, 115, 116, 118, 119, 125, 128, 138

(56) References Cited

U.S. PATENT DOCUMENTS

| | | | | |
|---|---|---|---|---|
| 5,987,590 A | * | 11/1999 | Wing So | |
| 6,463,545 B1 | * | 10/2002 | Fisher et al. | |
| 6,522,118 B1 | * | 2/2003 | Barcelo et al. | |
| 6,570,372 B2 | * | 5/2003 | Barcelo et al. | |

FOREIGN PATENT DOCUMENTS

| JP | 10 201127 | 7/1998 |
|---|---|---|
| JP | 11-073247 | 3/1999 |
| JP | 2000-020176 | 1/2000 |
| JP | 2000-201204 | 7/2000 |
| JP | 2000-339067 | 12/2000 |
| JP | 2001-075682 | 3/2001 |
| JP | 2001-202163 | 7/2001 |
| JP | 2002-108514 | 4/2002 |
| JP | 2003-32910 | 1/2003 |
| JP | 2003-029885 | 1/2003 |

OTHER PUBLICATIONS

§7.1.5, 7.1.5.1 and 7.1.5.2, Universal Serial Bus Specification Revision 2.0, Apr. 27, 2000, pp. 141–142.

* cited by examiner

Primary Examiner—Edward H. Tso
(74) Attorney, Agent, or Firm—Oliff & Berridge, PLC

(57) ABSTRACT

When an electronic instrument Q is in normal operating mode and set to be slave, power from a rechargeable battery or an external power source is supplied to a data transfer control circuit, and when the electronic instrument Q is in charge mode and set to be slave, power from VBUS is supplied thereto to charge a rechargeable battery. When an external power source can be used in charge mode, power from the external power source is supplied to the rechargeable battery instead of from VBUS. When an electronic instrument P is in normal operating mode and set to be master, power from a rechargeable battery or an external power source is supplied to the data transfer control circuit and the electronic instrument Q; and when the electronic instrument P is in charge mode and set to be master, power from the rechargeable battery or the external power source is supplied to the electronic instrument Q through the VBUS in order to charge a rechargeable battery of the electronic instrument Q. In charge mode, the supply of power to the data transfer control circuit is either turned off or an energy-saving mode is set.

24 Claims, 12 Drawing Sheets

DATA TRANSFER CONTROL (USB PROCESSING) CIRCUIT

POWER CONTROL CIRCUIT, ELECTRONIC INSTRUMENT, AND CHARGING METHOD

Japanese patent application no. 2001-243535 filed on Aug. 10, 2001 is hereby incorporated by reference in its entirety.

BACKGROUND

The present invention relates to a power control circuit, an electronic instrument, and a charging method.

It is usual for a portable electronic instrument such as mobile phones to be battery-powered, and it is necessary to provide a dedicated AC adapter or charger for charging a rechargeable battery (a chargeable storage battery, or secondary battery) thereof. It often happens that such an AC adapter or charger cannot be used in a portable electronic instrument of different types (made by the same manufacturer or another manufacturer). For that reason, when the possessor of a plurality of portable electronic instruments goes out, it is necessary to carry a number of AC adapters or chargers, which is inconvenient.

Recently, the universal serial bus (USB) standard has suddenly permeated the marketplace, as an interface standard for connecting a personal computer (hereinafter called "PC") to its peripherals. This USB standard has the advantage of enabling the use of connectors of the same standard to connect a peripheral instrument such as a mouse, keyboard, and printer, which are connected by connectors of different standards in the prior art, and of making it possible to implement plug-and-play and hot-plug features.

In addition to data lines (D+ and D−), a USB cable has power lines (VBUS and GND). Use of these power lines in the USB cable makes it possible to charge a portable electronic instrument such as mobile phones, and techniques disclosed in Japanese Patent Application Laid-Open Nos. 2000-339067 and 2000-201204 are known as prior-art techniques relating to such a charging method.

However, these prior-art techniques necessitate dedicated connectors and control circuits for connecting the USB cable to a portable electronic instrument such as a mobile phone, so that a general-purpose USB cable alone cannot be used for connecting a PC and the portable electronic instrument.

In addition, these prior-art techniques dictate that the side that supplies power for charging a rechargeable battery (the source of the power for charging) is fixed as the PC acting as host, and the side that charges the rechargeable battery with the power supplied from the charging power is fixed as the portable electronic instrument that is the device (function or target). It is therefore not possible to set an electronic instrument to be either the source that supplies the charging power or the destination of that charging power. A problem arises in that a PC which is a host must always be used when using a USB cable to charge a rechargeable battery of a portable electronic instrument.

SUMMARY

One aspect of the present invention relates to a power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer; and wherein when the electronic instrument has been set to the slave side for USB data transfer and has been set to charge mode, the power control circuit supplies power from the USB power line to the rechargeable battery of the electronic instrument in order to charge the rechargeable battery.

Another aspect of the present invention relates to a power control circuit used in an electronic instrument that is provided with a universal serial bus (USB) interface, wherein when the electronic instrument has been set to a master side for USB data transfer and has been set to normal operating mode, the power control circuit supplies power from a rechargeable battery or power from an external power source to a data transfer control circuit which controls USB data transfer; and wherein when the electronic instrument has been set to the master side for USB data transfer and has been set to charge mode, the power control circuit supplies power from the rechargeable battery or power from the external power source to another electronic instrument on a slave side through a USB power line, in order to charge a rechargeable battery of the other electronic instrument on the slave side connected to the electronic instrument by USB.

A further aspect of the present invention relates to a power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer;

wherein when the electronic instrument has been set to the slave side for USB data transfer and has been set to charge mode, the power control circuit supplies power from the USB power line to the rechargeable battery of the electronic instrument in order to charge the rechargeable battery;

wherein when the electronic instrument has been set to a master side for USB data transfer and has been set to normal operating mode, the power control circuit supplies power from the rechargeable battery or power from the external power source to the data transfer control circuit which controls USB data transfer; and wherein when the electronic instrument has been set to the master side for USB data transfer and has been set to charge mode, the power control circuit supplies power from the rechargeable battery or power from the external power source to another electronic instrument on the slave side through the USB power line, in order to charge a rechargeable battery of the other electronic instrument on the slave side connected to the electronic instrument by USB.

DETAILED DESCRIPTION

Figure 1A:
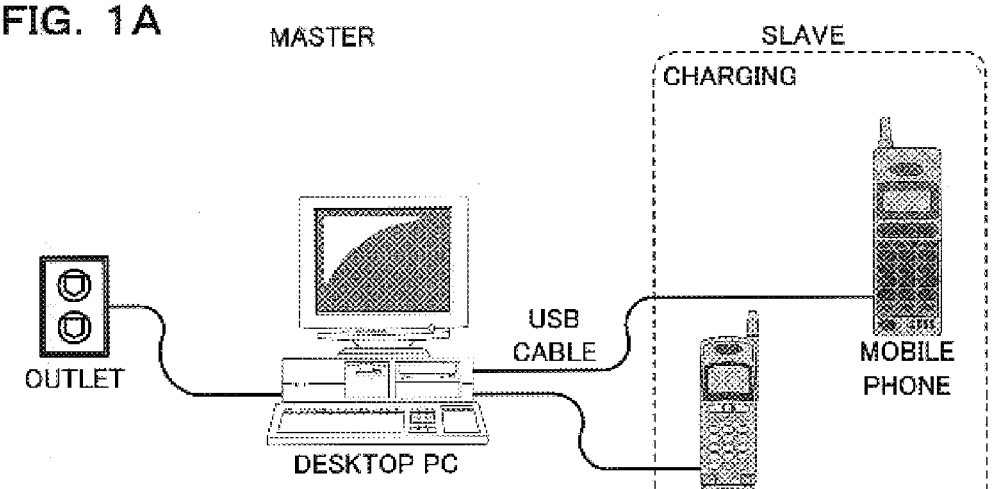
FIGS. 1A, 1B, and 1C are illustrative of the charging method of this embodiment.

Embodiments of the present invention are described in detail below.

Note that the embodiments described hereunder do not in any way limit the scope of the invention defined by the claims laid out herein. Note also that all of the elements of these embodiments should not be taken as essential requirements to the means of the present invention.

One embodiment of the present invention relates to a power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer; and wherein when the electronic instrument has been set to the slave side for USB data transfer and has been set to charge mode, the power control circuit supplies power from the USB power line to the rechargeable battery of the electronic instrument in order to charge the rechargeable battery.

With this embodiment, in normal operating mode, the data transfer control circuit (slave side) operates with power supplied from a USB power line, rechargeable battery (slave side), or external power source (slave side). In charge mode, on the other hand, power is supplied to the rechargeable battery (slave side) from the USB power line (electronic instrument on the master side), and the rechargeable battery is charged thereby.

The thus-configured embodiment of the present invention makes it possible to use a general-purpose USB cable to charge a rechargeable battery in an electronic instrument on the slave side, by way of example. If the user is in a situation in which there is no host available, it is possible to charge the rechargeable battery of the electronic instrument on the slave side by power from other electronic instrument on the master side. This enables an improvement in convenience to the user.

With this power control circuit, when the external power source is usable in charge mode, the power control circuit may supply power from the external power source to the rechargeable battery.

This makes it possible to use an external power source (slave side) with a high power supply capability, enabling efficient charging of the rechargeable battery of the slave-side electronic instrument.

The power control circuit may further comprise current limitation circuit which restricts a maximum current of power from the USB power line in charge mode.

This makes it possible to prevent the flow of a large current in the USB power line in charge mode, enhancing the reliability.

Another embodiment of the present invention relates to a power control circuit used in an electronic instrument that is provided with a universal serial bus (USB) interface, wherein when the electronic instrument has been set to a master side for USB data transfer and has been set to normal operating mode, the power control circuit supplies power from a rechargeable battery or power from an external power source to a data transfer control circuit which controls USB data transfer; and wherein when the electronic instrument has been set to the master side for USB data transfer and has been set to charge mode, the power control circuit supplies power from the rechargeable battery or power from the external power source to another electronic instrument on a slave side through a USB power line, in order to charge a rechargeable battery of the other electronic instrument on the slave side connected to the electronic instrument by USB.

This embodiment enables the supply of power from a rechargeable battery (master side) or external power source (master side) when in normal operating mode, for the operation of the data transfer control circuit (master side). In charge mode, on the other hand, power from the rechargeable battery (master side) or external power source (master side) is supplied to the USB power line, to charge a rechargeable battery of an electronic instrument on the slave side, which is connected to this USB power line.

The thus-configured embodiment of the present invention makes it possible to use a general-purpose USB cable to charge a rechargeable battery in an electronic instrument on the slave side, by way of example. If the user is in a situation in which there is no host available, it is possible to charge the rechargeable battery of the electronic instrument on the slave side by power from other electronic instrument on the master side. This enables an improvement in convenience to the user.

With this power control circuit, when the external power source is usable in charge mode, the power control circuit may supply power from the external power source to the other electronic instrument on the slave side through the USB power line.

This makes it possible to use an external power source (master side) with a high power supply capability, enabling efficient charging of the rechargeable battery of the slave-side electronic instrument.

A further embodiment of the present invention relates to a power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer;

wherein when the electronic instrument has been set to the slave side for USB data transfer and has been set to charge mode, the power control circuit supplies power from the USB power line to the rechargeable battery of the electronic instrument in order to charge the rechargeable battery;

wherein when the electronic instrument has been set to a master side for USB data transfer and has been set to normal operating mode, the power control circuit supplies power from the rechargeable battery or power from the external power source to the data transfer control circuit which controls USB data transfer; and wherein when the electronic instrument has been set to the master side for USB data transfer and has been set to charge mode, power from the rechargeable battery or power from the external the power control circuit supplies power source to another electronic instrument on the slave side through the USB power line, in order to charge a rechargeable battery of the other electronic instrument on the slave side connected to the electronic instrument by USB.

This embodiment makes it possible to impart power control functions to an electronic instrument on both the master side and the slave side. If the charge of the battery in an electronic instrument should drop, the rechargeable battery within that an electronic instrument can be charged by setting that an electronic instrument to be the slave and connecting it by a USB cable to another electronic instrument. Similarly, if the charge of the battery in the other electronic instrument should drop, the rechargeable battery within the other electronic instrument can be charged by setting the electronic instrument to be the master and connecting it by a USB cable to the other electronic instrument. This makes it possible to implement an extremely convenient charging method.

With this power control circuit, in charge mode, supply of power to the data transfer control circuit may be turned off or the data transfer control circuit is set to an energy-saving mode.

This makes it possible to prevent wasteful consumption of power by the data transfer control circuit when in charge mode, facilitating a reduction in the energy consumption of the electronic instrument.

With this power control circuit, when a first plug of a USB cable is connected to the electronic instrument, the power control circuit may determine that the electronic instrument is set to a master side, and when a second plug of the USB cable has been connected to the electronic instrument, the power control circuit may determine that the electronic instrument is set to the slave side, to select a power control function linked thereto.

This makes it possible to freely set an electronic instrument to either the master side or the slave side, simply by changing the way in which the USB cable is connected. It is possible to set an electronic instrument to the master side and supply power to an electronic instrument on the slave side, to charge a rechargeable battery of the electronic instrument on the slave side, or set an electronic instrument to the slave side and receive power from an electronic instrument on the master side, to charge the rechargeable battery of the electronic instrument.

With this power control circuit, each of the first and second plugs of the USB cable may have an identification terminal for identifying the master side or the slave side; and the power control circuit may determine whether the electronic instrument has been set to the master side or the slave side, by detecting a voltage level of the identification terminal when the electronic instrument is connected to one of the first and second plugs of the USB cable.

This makes it possible to determine whether an electronic instrument has been set to the master side or the slave side, by simple processing that merely detects the voltage level of the identification terminal.

Note that the circuit that detects the voltage level of the identification terminal could be conceived as a circuit comprising a resistor with one end connected to a first power source (such as a high-potential side of a power source, or VDD) and the other end connected to the identification terminal. It is desirable that the identification terminal is connected to a second power source (such as a low-potential side of a power source, GND) at the first plug, whereas the identification terminal is not connected to the second power source at the second plug.

With this power control circuit, when an electronic instrument connected to the first plug of the USB cable is forcibly set to the slave side and another electronic instrument connected to the second plug of the USB cable is forcibly set to the master side, power from the other electronic instrument connected to the second plug may be supplied through the USB power line to the electronic instrument connected to the first plug, to charge a rechargeable battery of the electronic instrument connected to the first plug.

This makes it possible to charge an electronic instrument connected to the first plug, which ought to be on the master side, by an electronic instrument connected to the second plug, which ought to be on the slave side, enhancing the convenience to the user.

In this case, the detection of the voltage level of the identification terminal may be invalidated, by way of example.

A still further embodiment of the present invention may comprise:

any of the above the power control circuits;

a rechargeable battery in which charging thereof is controlled by the power control circuit; and a data transfer control circuit which controls USB data transfer.

A yet further embodiment of the present invention relates to a charging method for an electronic instrument that is provided with a universal serial bus (USB) interface, comprising:

supplying power from a first electronic instrument on a master side through a USB power line to a second electronic instrument on a slave side and charging a rechargeable battery of the second electronic instrument, when the first electronic instrument has been connected to a first plug of a USB cable and is set to the master side and the second electronic instrument has been connected to a second plug of the USB cable and is set to the slave side; and supplying power from the second electronic instrument on the master side through the USB power line to the first electronic instrument on the slave side and charging a rechargeable battery of the first electronic instrument, when the first electronic instrument has been connected to the second plug of the USB cable and is set to the slave side and the second electronic instrument has been connected to the first plug of the USB cable and is set to the master side.

With this method, it is possible to set the first and second electronic instruments to be master and slave, respectively, and charge the rechargeable battery of the second electronic instrument from the power source of the first electronic instrument, if the battery of the second electronic instrument has run low, by way of example. Conversely, it is also possible to set the first and second electronic instruments to be slave and master, respectively, and charge the rechargeable battery of the first electronic instrument from the power source of the second electronic instrument, if the battery of the first electronic instrument has run low. This enables an improvement in convenience to the user.

This method may further comprise turning off a supply of power to the data transfer control circuit which controls USB data transfer, or setting the data transfer control circuit to an energy-saving mode, in charge mode.

This makes it possible to prevent wasteful consumption of power by the data transfer control circuit when in charge mode, facilitating a reduction in the energy consumption of the electronic instrument.

This method may further comprise supplying power to an electronic instrument connected to the first plug from another electronic instrument connected to the second plug through the USB power line, and charging a rechargeable battery of the electronic instrument connected to the first plug, when the electronic instrument connected to the first plug of the USB cable is forcibly set to the slave side and the other electronic instrument connected to the second plug of the USB cable is forcibly set to the master side.

This makes it possible to charge an electronic instrument connected to the first plug, which ought to be on the master side, by an electronic instrument connected to the second plug, which ought to be on the slave side, enhancing the convenience to the user.

In this case, the detection of the voltage level of the identification terminal may be invalidated, by way of example.

These embodiments are described below in more detail, with reference to the accompanying figures.

1. Method of Charging Electronic Instrument, Using USB Cable

This embodiment of the present invention is characterized in that a rechargeable battery (a chargeable storage battery, or secondary battery) of an electronic instrument is charged by using a USB (generally speaking: a serial bus to which a large number of electronic devices can be connected in a generic manner, or a serial bus such that a device connected to a first plug becomes the master and a device connected to a second plug becomes the slave—hereinafter the same) cable (general-purpose cable).

More specifically, power is supplied through a USB power line (VBUS) from an electronic instrument on the master side to an electronic instrument on the slave side, and a rechargeable battery of the electronic instrument on the slave side is charged by the thus-supplied power. In other words, although the original functions of a USB cable were to transfer data signals (D+ and D−) and supply power, this power supply function can be utilized to charge a rechargeable battery of the electronic instrument.

As shown by way of example in FIG. 1A, power is supplied through a USB power line from a desktop personal computer (PC) that is the master side to a mobile phone on the slave side, to charge the rechargeable battery of the mobile phone.

Figure 1B:
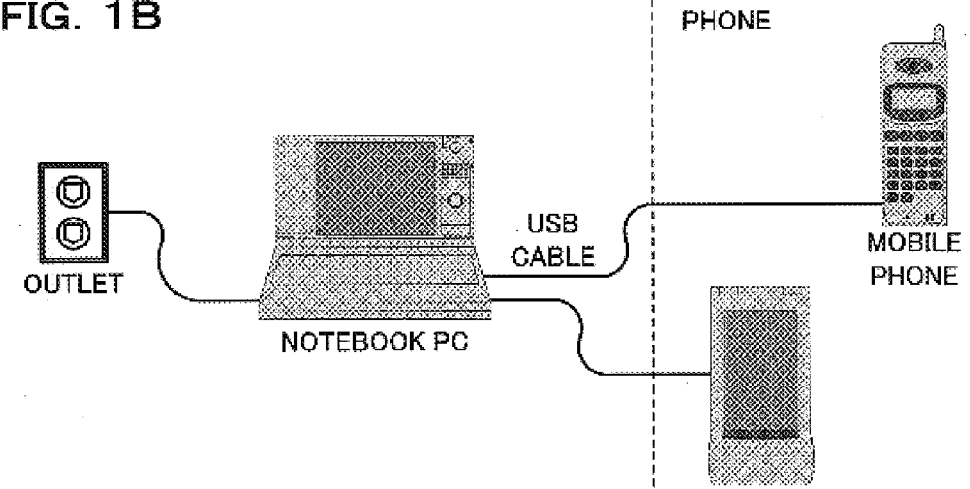
Figure 1C:
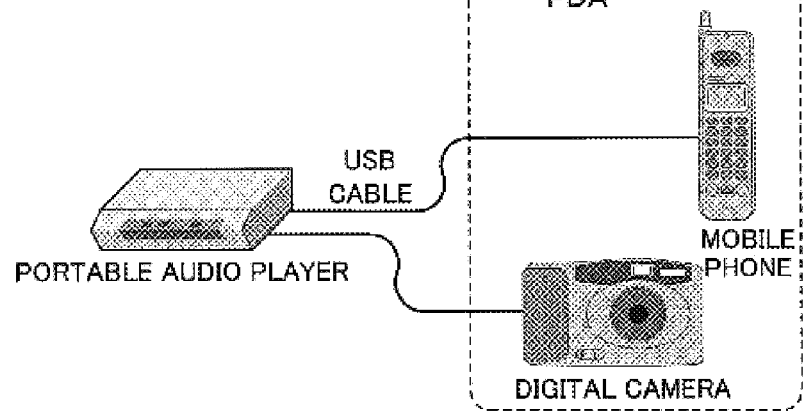

Similarly, power is supplied through a USB power line from a notebook-type PC or portable audio player on the master side to a personal digital assistant (PDA) or digital camera (still camera) on the slave side, to charge the rechargeable battery of the PDA or camera, as shown in FIGS. 1B and 1C.

It is expected that the world-wide standard USB will be used actively in the future for a portable electronic instrument such as mobile phones. If USB can be used to charge the rechargeable battery in a portable electronic instrument that is provided with a USB port, therefore, there will be no need to walk around with a dedicated AC adapter or charger, enabling an increase in convenience to the user.

If there is another electronic instrument provided with a USB port to hand, the USB port of the electronic instrument can be used to charge the rechargeable batteries of all the other electronic instrument the user may have.

Note that an electronic instrument to which the charging method of this embodiment can be applied is not limited to the portable audio player, mobile phones, PDA, and digital camera shown in FIGS. 1A, 1B, and 1C. For example, this method can also be applied to various other devices, including mass-storage devices (such as optical disk drives, magneto-optical disk drives, and hard disk drives), scanners, printers, keyboards, computer mice, TVs, VCRs, video cameras, projectors, electronic organizers, word processors, or Global Positioning System (GPS) devices, by way of example.

If the electronic instrument on the master side is connected by an outlet or the like to an external power source (AC power source), as shown in FIGS. 1A and 1B, it is preferable to supply power from that external power source through the USB power line to the electronic instrument on the slave side, to charge the rechargeable battery thereof. This makes it possible to treat the electronic instrument on the master side as if it were an AC adapter or charger, enabling an increase in convenience to the user.

If the electronic instrument on the master side is not connected to an external power source, as shown in FIG. 1C, power from a rechargeable battery of the electronic instrument on the master side could be supplied through the USB line to the electronic instrument on the slave side, so that the rechargeable battery thereof can be charged. This makes it possible to use the power from a rechargeable battery of a portable audio player to charge the rechargeable battery of a digital camera, if there is sufficient power remaining in the battery of the portable audio player and the battery of the camera has run low, by way of example. This enables an improvement in the convenience to the user.

Figure 2A:
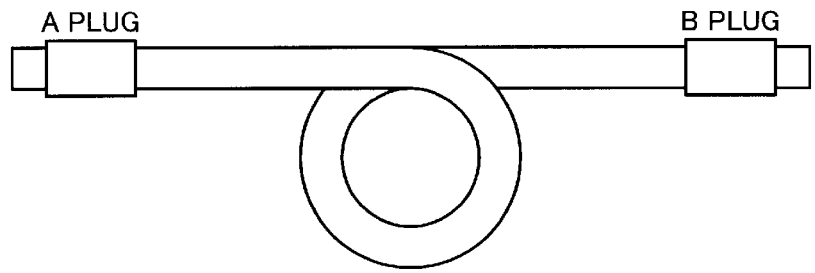
FIGS. 2A, 2B, 2C, and 2D are illustrative of USB cables and plugs.

A USB cable has an A plug (generally speaking, a first plug: hereinafter the same) and a B plug (generally speaking, a second plug: hereinafter the same), as shown in FIG. 2A. Note that the A plug and the B plug will have different shapes in practice.

Figure 2B:
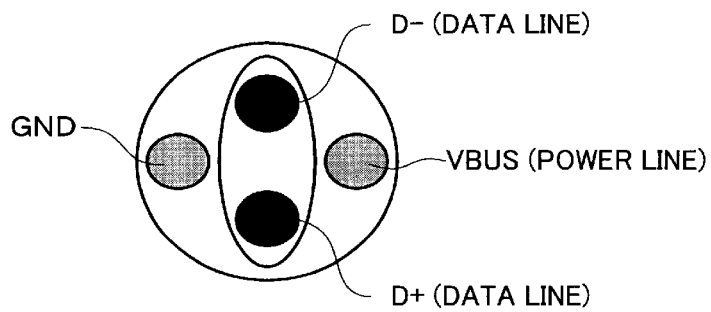

In addition, the USB cable has data lines (D+ and D−), a ground (GND) line, and a power (VBUS) line, as shown in the section of FIG. 2B.

With versions of USB up to the present (such as USB 1.1), the standard is such that the A plug (A connector) of the USB cable is connected to the host side, such as a PC, and the B plug (B connector) is connected to a device (function, target) side, such as a mouse. More specifically, it is necessary to connect the A plug so that it is oriented towards the upstream side towards the host system and the B plug so that it is oriented towards the downstream side towards a USB device.

With USB connections up until the present, therefore, it has always been necessary to operate through a host machine, such as a PC, for data transfer, making it impossible to perform data transfer by connecting devices directly by a USB cable. To output images taken by a digital camera to a printer, for example, it is necessary to connect the digital camera to a PC by a USB cable, transfer the image data through the USB cable to the PC, then use means such as a USB cable to transfer the image data from the PC to the printer. If there is no PC to hand, therefore, the digital camera images cannot be output to the printer, which is inconvenient to the user.

A standard called USB On-The-Go (hereinafter abbreviated to OTG) has recently been proposed as means of solving these inconveniences with USB of the prior art. This OTG is a standard that imparts a simple host function to a device such as a digital camera that does not normally have the host function, enabling direct connection of USB devices without the intercession of a PC.

More specifically, OTG does not limit the host to be on the side connected to the A plug, and it does not limit the device (function, target) on the side connected to the B plug. In other words, the user can simply connect an electronic instrument that is to be set to be the master (A device) to the A plug (mini A plug) and the electronic instrument that is to be set to be the slave to the B plug (mini B plug).

Figure 2C:
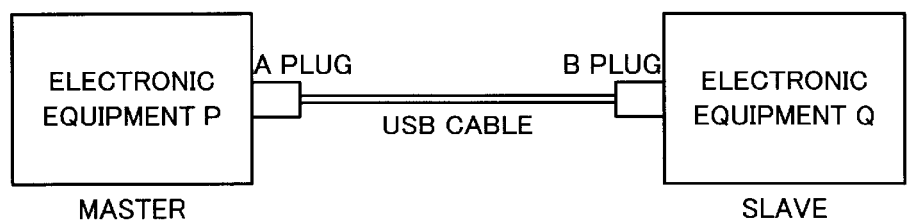

For example, assume that an electronic instrument P is connected to the A plug (first plug, first connector) of the USB cable and electronic instrument Q is connected to the B plug (second plug, second connector), as shown in FIG. 2C. The electronic instrument P therefore becomes the master (A device) and the electronic instrument Q becomes the slave (B device), as shown in FIG. 2C.

Figure 2D:
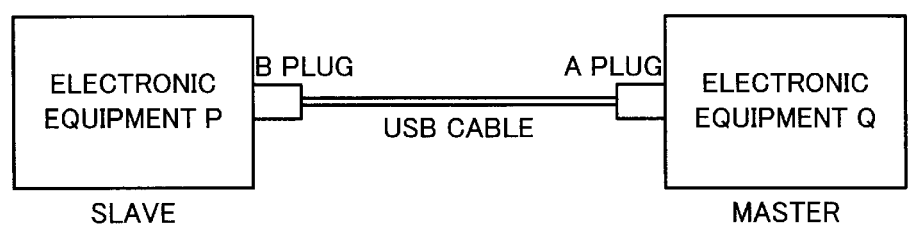

Conversely, FIG. 2D shows the electronic instrument Q connected to the A plug of the USB cable and the electronic instrument P connected to the B plug. The electronic instrument Q therefore becomes the master (A device) and the electronic instrument P becomes the slave (B device), in the opposite configuration from FIG. 2C.

This OTG enables reception of power by the master (source of power) or by the slave (destination of power) by simply reconnecting the USB cable. The use of host negotiation protocol (HNP), which is a host exchange protocol, also makes it possible to switch the roles of host and device (peripheral) between two electronic instruments. This means the a device that cannot fulfill the role of host under the prior-art USB implementations can now take on the role of host (a simple host). This makes it unnecessary to go through a host such as a PC, enabling direct connection between electronic instruments that are devices, thus enabling a increase in convenience to the user.

Figure 3A:
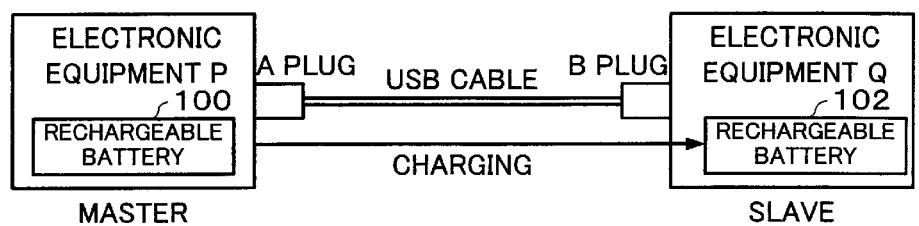
FIGS. 3A and 3B are illustrative of the charging method of this embodiment.

This embodiment also implements a method of charging an electronic instrument that makes effective use of this USB OTG standard In other words, if the electronic instrument P (first electronic instrument) is connected to the A plug (first plug) of the USB cable and the electronic instrument Q (second electronic instrument) is connected to the B plug (second plug) of the USB cable, power from the electronic instrument P on the master side (power from a rechargeable battery 100 or an external power source) is supplied to the electronic instrument Q through the USB power line VBUS, to charge a rechargeable battery 102 of the electronic instrument Q, as shown in FIG. 3A.

If the electronic instrument P is connected to the B plug of the USB cable and the electronic instrument Q is connected to the A plug thereof, on the other hand, power from the electronic instrument Q on the master side (power from the rechargeable battery 102 or an external power source) is supplied to the electronic instrument P on the slave side through the USB power line VBUS, to charge the rechargeable battery 100 of the electronic instrument P.

Figure 3B:
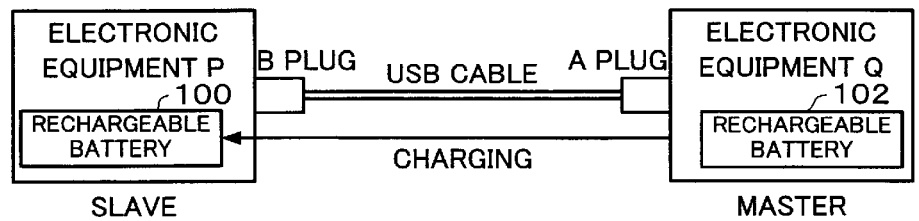

This embodiment as described above succeeds in ensuring that an electronic instrument can be set to be a source of charging power or a recipient of charging power, depending on circumstances. For example, the electronic instrument P could be the source of charging power (on a side that supplies power for charging the rechargeable battery 102) as shown in FIG. 3A, or it could be a destination of charging power (on a side which is supplied with charging power, to charge the rechargeable battery 100) as shown in FIG. 3B.

If the user takes a portable audio player and a digital camera when going out, and the battery of the camera runs low, it is possible to charge the depleted rechargeable battery of the camera by connecting the portable audio player to the A plug of the USB cable and the digital camera to the B plug thereof. Conversely, if it is the battery of the portable audio player that has run low, it is possible to charge the depleted rechargeable battery of the audio player by connecting the digital camera to the A plug of the USB cable and the portable audio player to the B plug thereof. This enables a great improvement in convenience to the user.

This embodiment also makes it possible to use USB to connect together portable electronic instruments in situations where there is no host PC, to use the power source from an electronic instrument to charge the rechargeable battery of the other electronic instrument.

This embodiment of the present invention makes it possible to use a general-purpose USB cable (such as an OTG-standard USB cable) to charge an electronic instrument. It is therefore unnecessary to provide a dedicated AC adapter or charger for an electronic instrument, or dedicated connectors for connecting an electronic instrument such as a mobile phone to a USB cable, enabling the provision of a charging method that is convenient to the user.

2. Configuration

Figure 4:
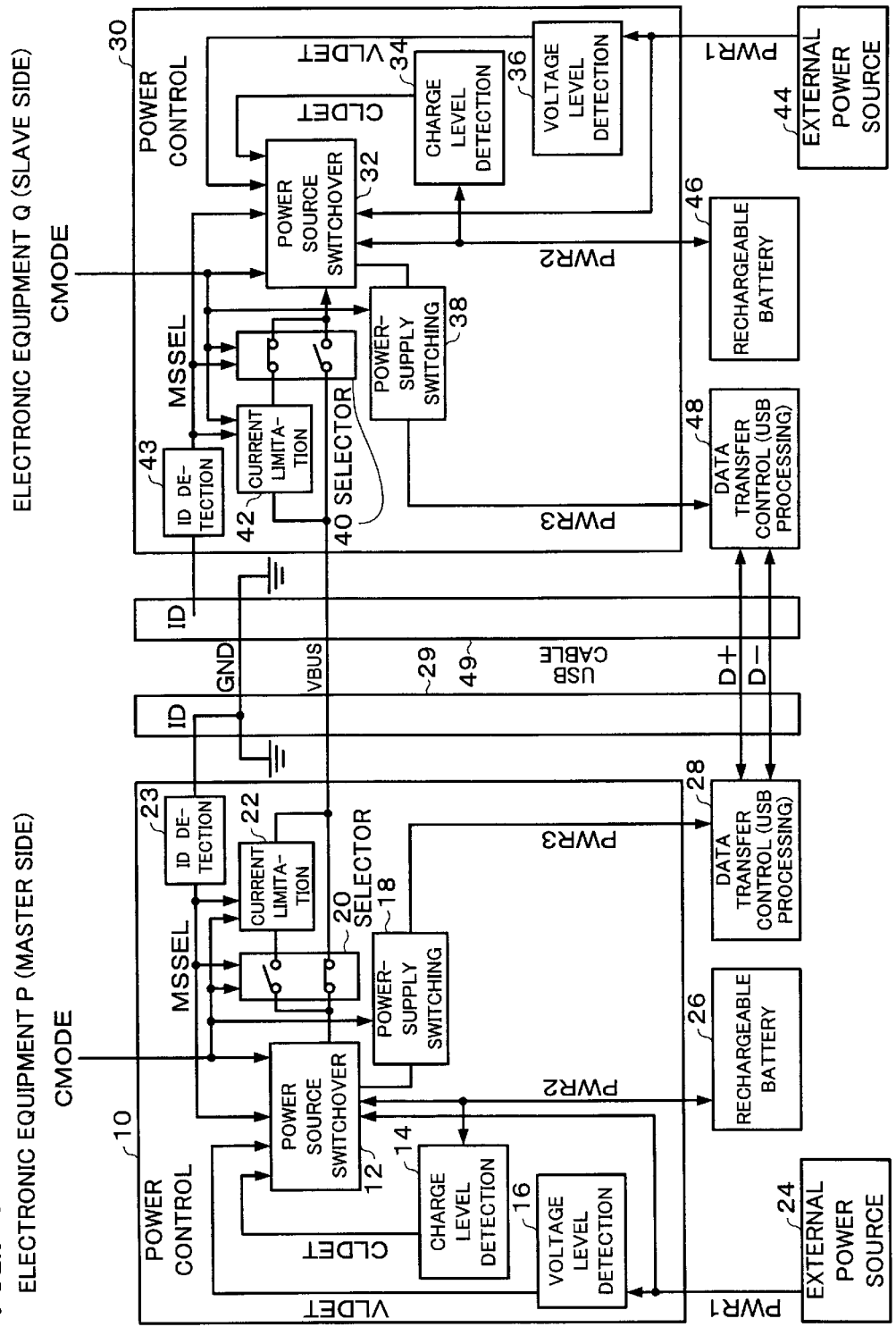
FIG. 4 is illustrative of an example of the configuration of the power control circuit and electronic instrument of this embodiment.

An example of the configuration of a power control circuit (charge control circuit) that implements the charging method of FIGS. 3A and 3B, and an electronic instrument comprising that power control circuit, is shown in FIG. 4. Note that the power control circuit and electronic instrument of the present invention do not necessarily comprise all of the circuit blocks shown in FIG. 4, and thus it is possible to conceive a configuration such that some parts thereof are omitted. The description below mainly concerns an example in which the electronic instrument P is set to the master side and the electronic instrument Q is set to the slave side.

The electronic instrument P (master side) comprises a power control circuit 10, a rechargeable battery 26, and a data transfer control circuit (USB processing circuit) 28 for data transfer in conformation with the USB standard. This electronic instrument P could be configured to comprise components such as an operating section for enabling the user to operate the electronic instrument, a display section for displaying images, a sound output section for outputting sounds, a storage section for storing a program and data, or a central processing unit (CPU) that controls the entire electronic instrument based on that program. This electronic instrument P can also be connected to an external power source 24 (an AC power source) and it can also operate on power from the external power source 24 instead of power from the rechargeable battery 26.

The power control circuit 10 comprises a power source switchover circuit 12, a charge level detection circuit 14, a voltage level detection circuit 16, a power-supply switching circuit 18, a selector 20, a current limitation circuit 22, and an ID detection circuit 23.

The power source switchover circuit 12 receives various signals such as a master/slave selection (switchover, setting) signal MSSEL, a charge mode signal CMODE, a charge level detection signal CLDET, and a voltage level detection signal VLDET for an external power source, and performs various types of processing for controlling the switching of the power supply. More specifically, it controls switching (connections) between the USB power line VBUS, a power line PWR1 of the external power source 24, a power line PWR2 of the rechargeable battery 26, and a power line PWR3 of the data transfer control circuit 28.

The charge level detection circuit 14 detects the charge level during the charging of the rechargeable battery 26. When the charge level of the rechargeable battery 26 exceeds a given threshold value, the charge level detection signal CLDET goes active.

The voltage level detection circuit 16 detects the voltage level of the power line PWR1 of the external power source 24, to determine whether or not the external power source 24 is connected to the electronic instrument. If the external power source 24 is connected to the electronic instrument and its usage is enabled, the voltage level detection signal VLDET is made active.

The power-supply switching circuit 18 controls the turning on and off of the supply of power (PWR3) to the data transfer control circuit 28. More specifically, if the charge mode signal CMODE is made active to activate charge mode, the power-supply switching circuit 18 turns off (cuts, restricts) the supply of power to the data transfer control circuit 28. This makes it possible to prevent wasteful power consumption when in charge mode. Note that the data transfer control circuit 28 could also be set to an energy-saving mode in charge mode.

The selector 20 selects either a path on the USB power line VBUS side or a path on the current limitation circuit 22 side. More specifically, it selects the VBUS path in normal operating mode (when CMODE is inactive) or the current limitation circuit 22 path in charge mode (when CMODE is active).

The current limitation circuit 22 restricts the maximum current flowing through the power line VBUS in charge mode. This makes it possible to prevent the flow of excess current through VBUS in charge mode.

The current limitation circuit 22 may comprise a current limitation transistor and voltage setting circuit. The current limitation transistor includes a first terminal connected to the selector 20 (the power source switchover circuit 12) and a second terminal connected to the USB powerline VBUS. The voltage setting circuit sets a gate terminal of the current limitation transistor to a voltage corresponding to a maximum current value.

Note that these functions of the selector 20 and the current limitation circuit 22 are not necessary in an electronic instrument set to the master side.

In other words, if the electronic instrument P has been set to the master side, the selector 20 always selects the VBUS-side path, regardless of whether or not charge mode is set, and the function of the current limitation circuit 22 is disabled.

The ID detection circuit 23 detects the voltage level in an ID terminal (identification terminal) of a connector 29 (socket and plug), and generates the master/slave selection (switchover, setting) signal MSSEL.

Note that the configuration of the electronic instrument Q and a power control circuit 30 thereof is substantially the same as the configuration of the electronic instrument P, as shown in FIG. 4, and the power control circuit 10 thereof, so further description is omitted. It should be noted, however, that the configuration of an electronic instrument that will not be set to the master side could omit the provision of the selectors (20 and 40) and the current limitation circuits (22 and 42).

Figure 5A:
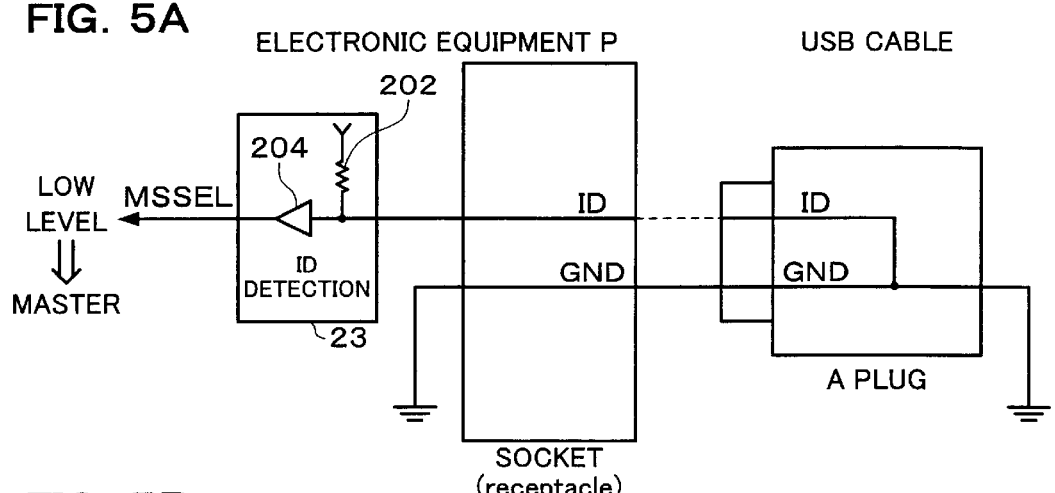
FIGS. 5A, 5B, and 5C are illustrative of the method of setting master and slave and the method of setting charge mode or normal operating mode.
Figure 5B:
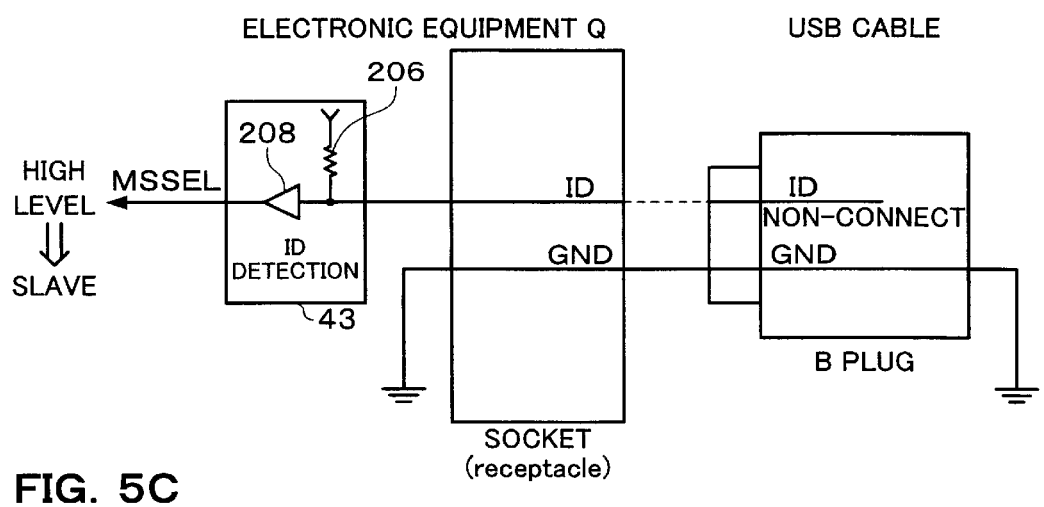

The determination of whether an electronic instrument has been set to master or slave is done by the method shown in FIGS. 5A and 5B.

Assume, by way of example, that sockets on the electronic instrument side can be connected to each of differently shaped A and B plugs, as shown in FIGS. 5A and 5B. If the A plug of the USB cable is connected to a socket of the electronic instrument P as shown in FIG. 5A and the B plug is connected to a socket of the electronic instrument Q as shown in FIG. 5B, the electronic instrument P is set to be master and the electronic instrument Q is set to be slave.

More specifically, in addition to terminals for the data lines D+ and D−, the power line VBUS, and the GND line shown in FIG. 2B, the ID terminal is provided in the socket (receptacle) and plug as shown in FIGS. 5A and 5B. This ID terminal is connected to the ID detection circuit 23 in the electronic instrument P (the master side) and to an ID detection circuit 43 in the electronic instrument Q (the slave side). Each of these ID detection circuits 23 and 43 comprises resistors 202 and 206 (pull-up resistors) such that one end is connected to a power source (a first power source) on a high-potential side and the other end thereof is connected to the corresponding ID terminal, and buffers 204 and 208 for buffering the signals (voltage levels) at the ID terminal.

The ID terminal is also connected to GND (a low-potential power source, a second power source) in the A plug (mini A plug), as shown in FIG. 5A. If the A plug is connected to a socket of the electronic instrument P, therefore, the voltage level of the ID terminal goes low and thus a low-level master/slave selection signal MSSEL is output to the ID detection circuit 23. This enables the electronic instrument P (power control circuit) to determine that it is set to the master side.

The ID terminal in the B plug (mini B plug), on the other hand, is set to a non-connected state. If this B plug is connected to a socket of the electronic instrument Q therefore, the voltage level of the ID terminal is pulled up by the resistor 206 to a high level and thus the high-level master/slave selection signal MSSEL is output from the ID detection circuit 43. This enables the electronic instrument Q (power control circuit) to determine that it is set to the slave side.

In the thus-configured embodiment, the determination of whether an electronic instrument has been set to be master or slave is based on the MSSEL signal which is obtained as the result of detecting the voltage level of the ID terminal when the socket and plug are connected together.

Figure 5C:
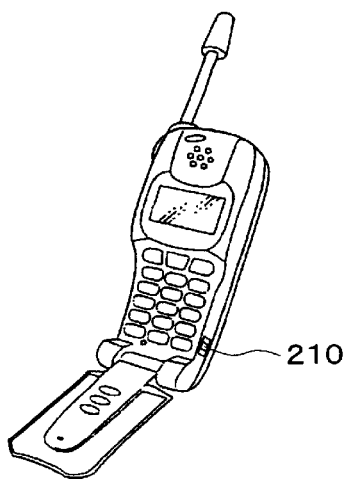

With this embodiment, the setting of an electronic instrument to normal operating mode (a mode other than charge mode, or a mode in which the data transfer control circuit operates normally) or to charge mode (a mode in which the rechargeable battery is charged) is selected by using a switch 210 such as that shown in FIG. 5C. Specifically, if the switch 210 is moved by the user to the normal operating mode side, the electronic instrument is set to normal operating mode; whereas if it is moved to the charge mode side, the electronic instrument is set to charge mode. The determination of whether the electronic instrument (power control circuit) has been set to normal operating mode or charge mode can be based on the signal level of the charge mode signal CMODE that changes with the state of the switch 210.

Note that, instead of providing the electronic instrument with a dedicated switch 210, it is possible to use a switching means (such as an operating button or key) of the operating section that the electronic instrument is provided with, to switch between normal operating mode and charge mode. Alternatively, software means could be used for the switching between normal operating mode and charge mode.

With the above-described charging method of this embodiment, the master/slave selection signal MSSEL and the charge mode signal CMODE are used to determine whether the electronic instrument is on the master side or the slave side, and whether it is set to normal operating mode or charge mode.

If the electronic instrument Q has been set to the slave side and it has also been set to charge mode, by way of example, power from the electronic instrument P on the master side is supplied through the USB power line VBUS to charge a rechargeable battery 46 within the electronic instrument Q itself.

If the electronic instrument P has been set to the master side and it has also been set to charge mode, on the other hand, the electronic instrument P on the master side supplies power to the electronic instrument Q on the slave side, through the USB power line VBUS, in order to charge the rechargeable battery 46 of the electronic instrument Q on the slave side.

3. Operation

The description now turns to the operation of this embodiment, with reference to the flowcharts of FIGS. 6 to 10. Note that the description below concerns the case in which the electronic instrument P is set to the master side and the electronic instrument Q is set to the slave side.

Figure 6:
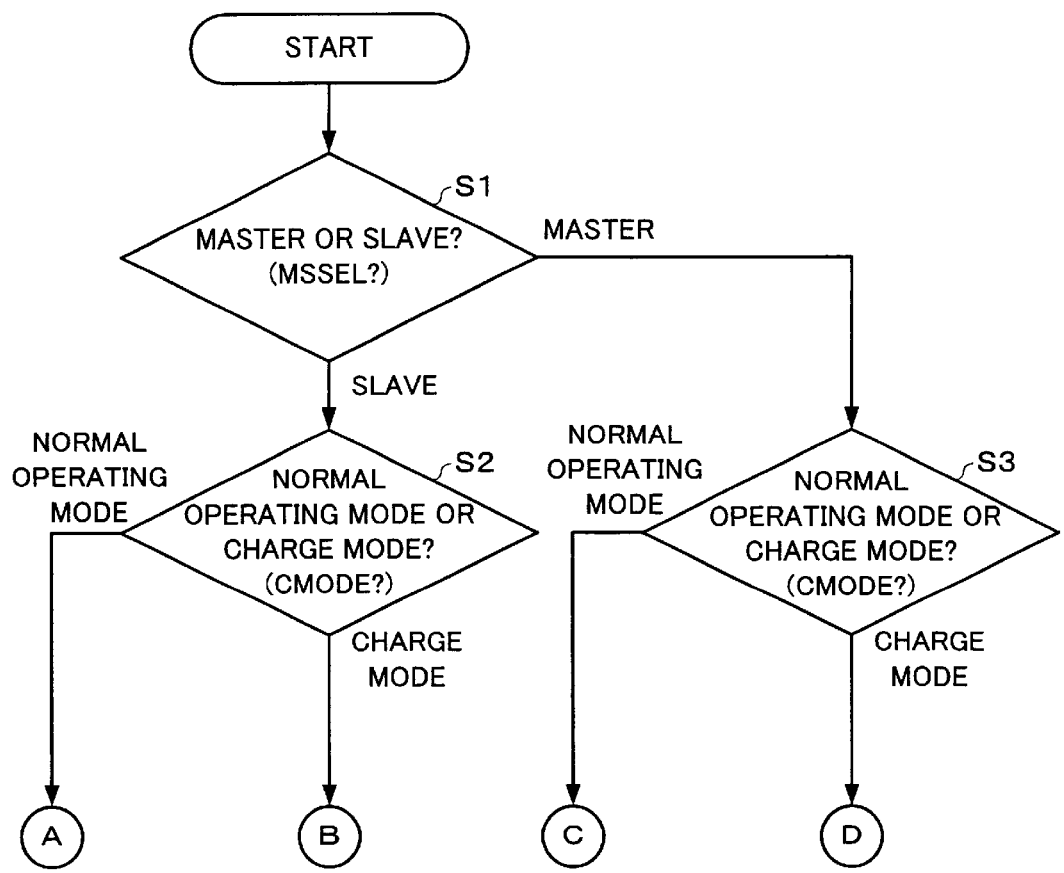
FIG. 6 is a flowchart illustrating the operation of this embodiment.

First of all, the electronic instrument determines whether it is master or slave, as shown in FIG. 6, based on the MSSEL signal (step S1). If it is determined to be the slave, it determines whether it is in normal operating mode or charge mode, based on the CMODE signal (step S2). If it is determined to be in normal operating mode, the processing moves to that shown in FIG. 7; if it is determined to be in charge mode, the processing moves to that shown in FIG. 8.

If the electronic instrument has been determined in step S1 to be the master, it determines whether it is in normal operating mode or charge mode, based on the CMODE signal (step S3). If it is determined to be in normal operating mode, the processing moves to that shown in FIG. 9; if it is determined to be in charge mode, the processing moves to that shown in FIG. 10.

Figure 7:
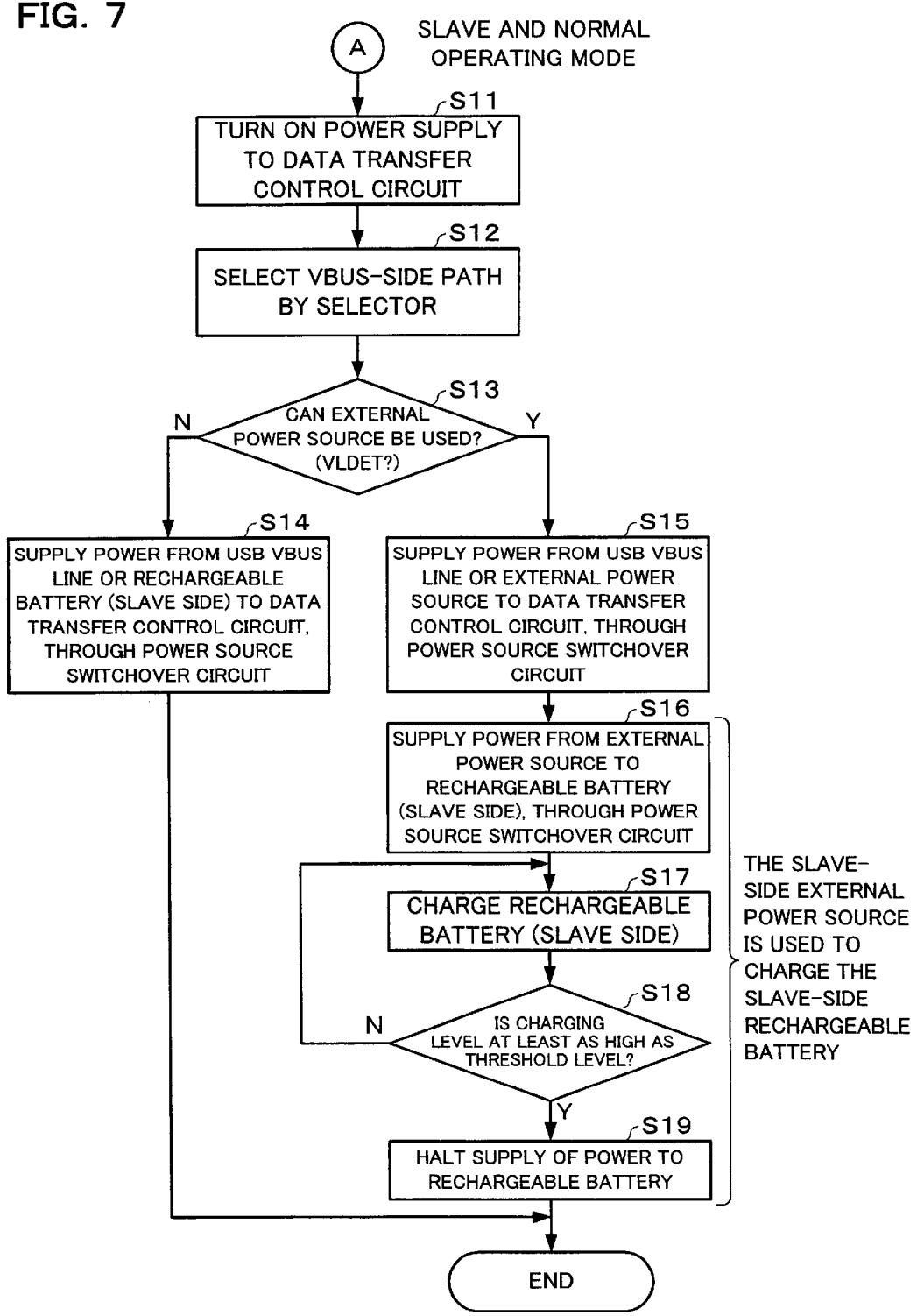
FIG. 7 is a flowchart illustrating the operation of this embodiment for an electronic instrument set to be slave and set to normal operating mode.

If the electronic instrument Q is the slave and is also in normal operating mode, as shown in FIG. 7, power is supplied to a data transfer control circuit 48 by a power-supply switching circuit 38 (step S11). The VBUS-side path is selected by a selector 40 (step S12).

The system then determines whether or not the external power source 44 can be used (whether or not it is connected), based on the VLDET signal from the voltage level detection circuit 36 (step S13). If the external power source 44 cannot be used, power is supplied from the USB VBUS line or the rechargeable battery 46 to the data transfer control circuit 48, through the power source switchover circuit 32 (step S14). If it is determined in step S13 that the external power source 44 can be used, on the other hand, power is supplied from the USB VBUS line or the external power source 44 to the data transfer control circuit 48, through the power source switchover circuit 32 (step S15). This configuration ensures that power can be supplied to the data transfer control circuit 48 on the slave side, for normal operation.

Power is then supplied from the external power source 44 to the rechargeable battery 46, through the power source switchover circuit 32, to charge the rechargeable battery 46 (steps S16 and S17). The system then determines whether or not the charge level has reached a threshold value (step S18), and, if the level is at least as high as the threshold value, the power supply to the rechargeable battery 46 is halted (step S19).

Figure 8:
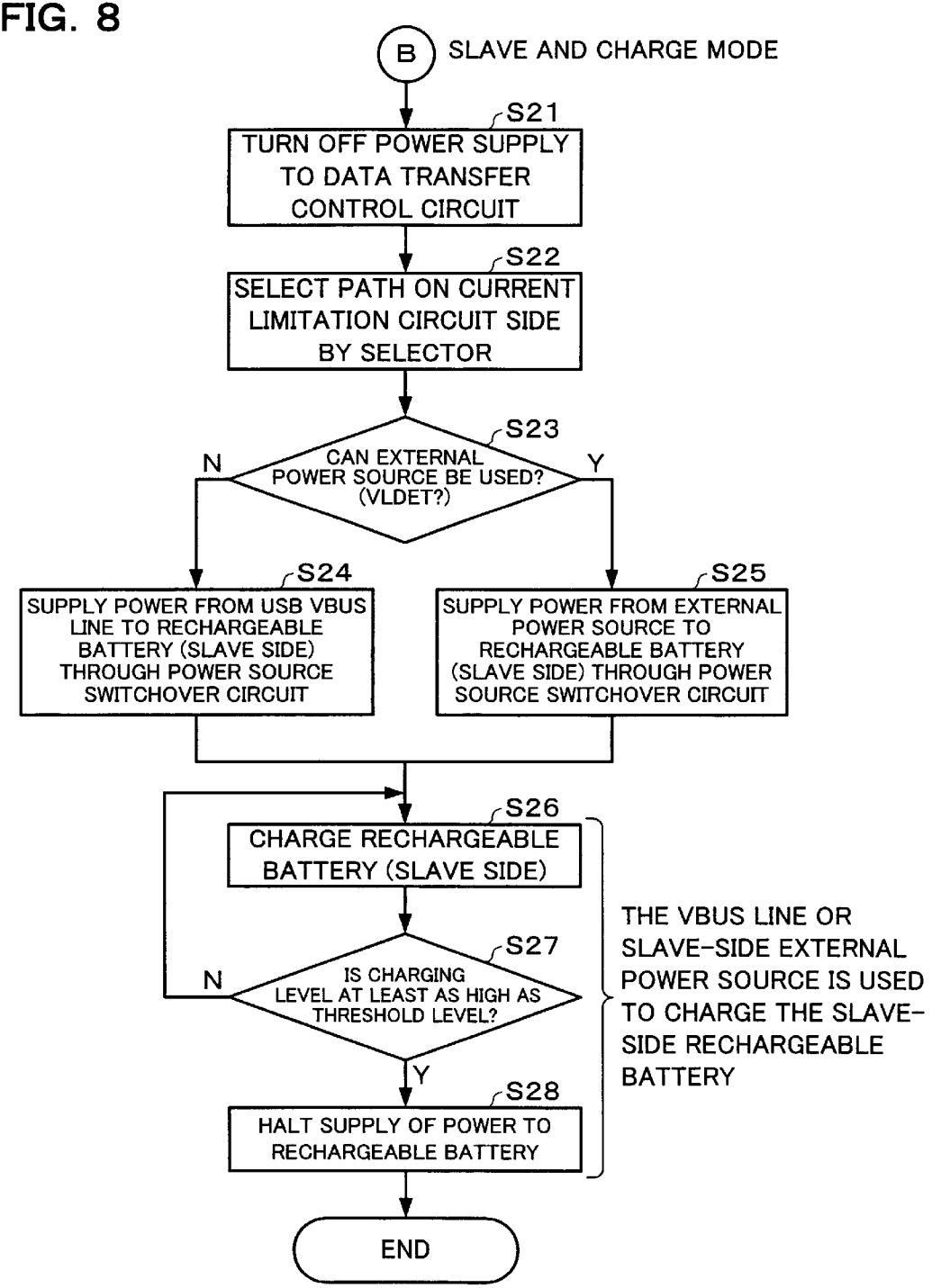
FIG. 8 is a flowchart illustrating the operation of this embodiment for an electronic instrument set to be slave and set to charge mode.

If the electronic instrument Q is set to be the slave and is also set to charge mode, as shown in FIG. 8, the supply of power to the data transfer control circuit 48 is turned off by the power-supply switching circuit 38 (step S21). This makes it possible to prevent wasteful consumption of power when the electronic instrument is in charge mode. The selector 40 selects a path on a current limitation circuit 42 side (step S22). This makes it possible to prevent the flow of a large current through the VBUS line when in charge mode.

The system then determines whether or not the external power source 44 can be used, based on the VLDET signal (step S23). If the external power source 44 cannot be used, power is supplied from the USB VBUS line to the rechargeable battery through the power source switchover circuit 32 (step S24). If the external power source 44 can be used, on the other hand, power is supplied from the external power source 44 to the rechargeable battery 46 through the power source switchover circuit 32 (step S25).

In a similar manner to steps S17 to S19 of FIG. 7, the rechargeable battery 46 is charged with the supplied power until the charge level is at least as high as a threshold value (steps S26 to S28).

The embodiment as described above is configured in such a manner that, if the external power source 44 can be used when in charge mode, power from the external power source 44 charges the rechargeable battery 46 on the slave side instead of power from the USB power line VBUS. This ensures that the rechargeable battery 46 can be efficiently charged by using the external power source 44 on the slave side, if the electronic instrument P is not connected to the external power source 24 on the master side.

Figure 9:
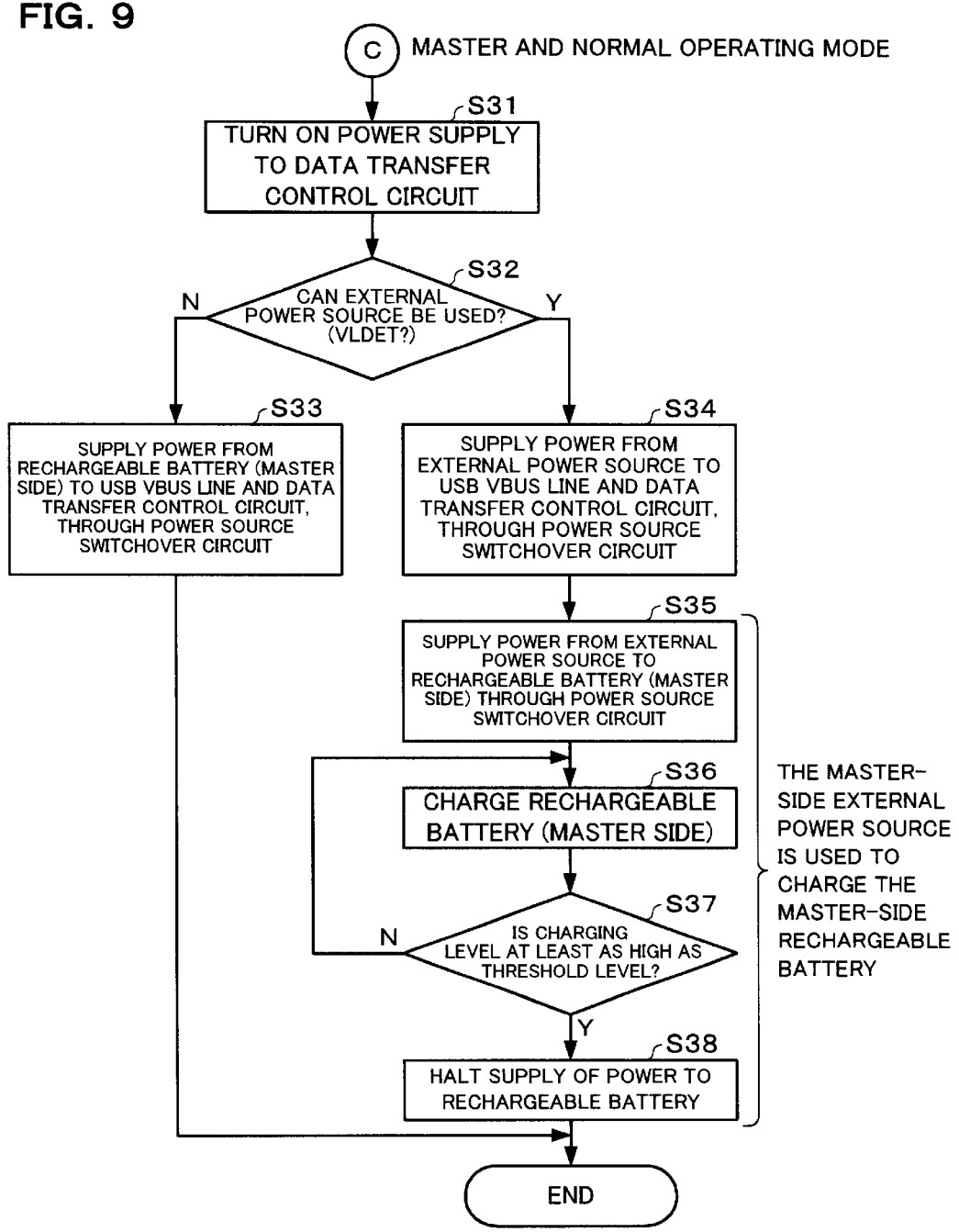
FIG. 9 is a flowchart illustrating the operation of this embodiment for an electronic instrument set to be master and set to normal operating mode.

If the electronic instrument P is set to be the master and is also set to normal operating mode, as shown in FIG. 9, the supply of power to the data transfer control circuit 28 is turned on by the power-supply switching circuit 18 (step S31).

The system then determines whether or not the external power source 24 can be used, based on the VLDET signal from the voltage level detection circuit 16 (step S32). If the external power source 24 cannot be used, power is supplied from the rechargeable battery 26 to the USB VBUS line and the data transfer control circuit 28, through the power source switchover circuit 12 (step S33). If it is determined in step S32 that the external power source 24 can be used, on the other hand, power is supplied from the external power source 24 to the USB VBUS line and the data transfer control circuit 28, through the power source switchover circuit 12 (step S34). This configuration ensures that power can be supplied to the electronic instrument Q (the data transfer control circuit 48) on the slave side and also to the data transfer control circuit 28 on the master side, for normal operation.

Power is then supplied from the external power source 24 to the rechargeable battery 26 on the master side, through the power source switchover circuit 12 (step S35). In a similar manner to steps S17 to S19 of FIG. 7, the rechargeable battery 26 is charged with the supplied power until the charge level is at least as high as a threshold value (steps S36 to S38).

Figure 10:
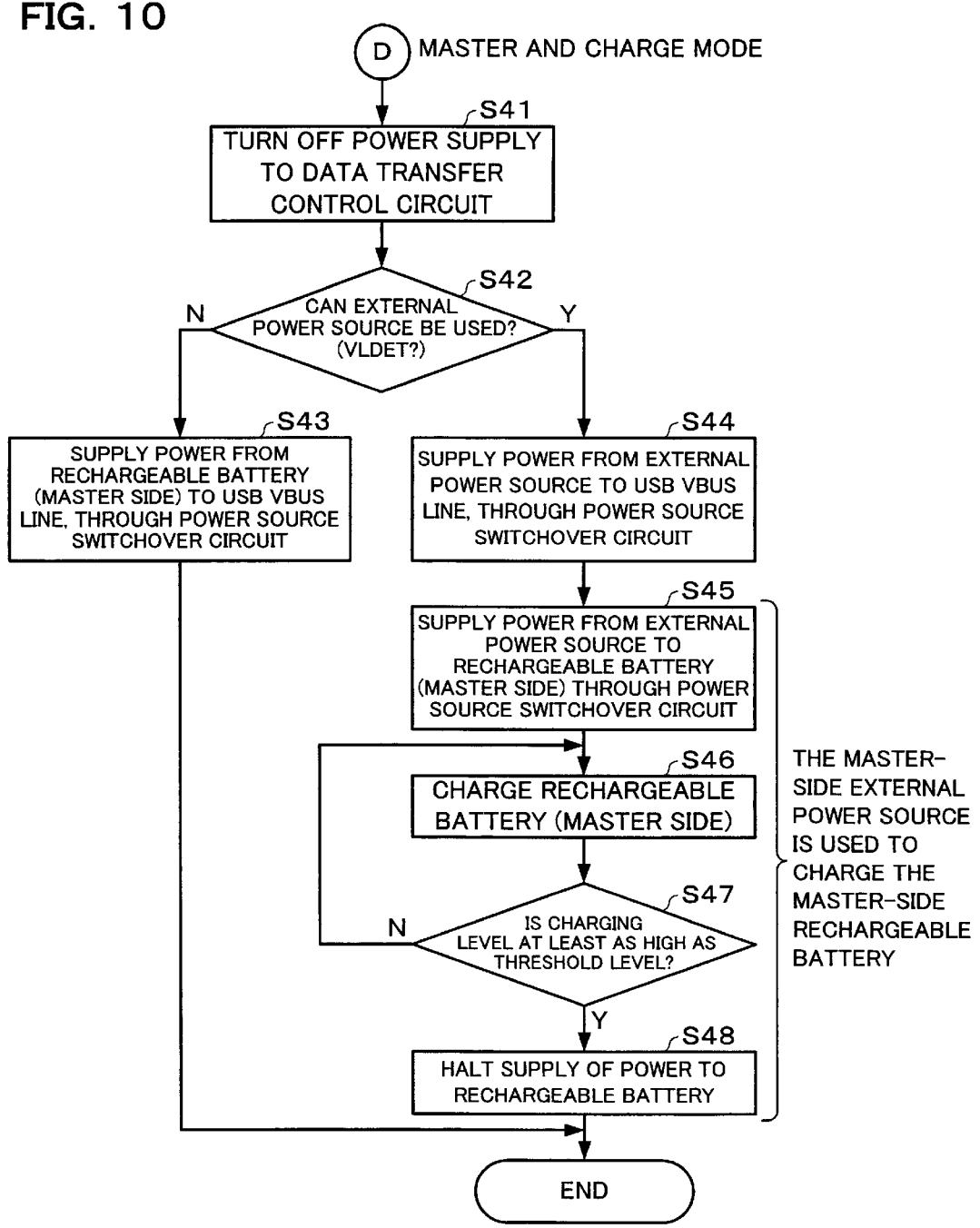
FIG. 10 is a flowchart illustrating the operation of this embodiment for an electronic instrument set to be master and set to charge mode.

If the electronic instrument P is set to be the master and is also set to charge mode, as shown in FIG. 10, the supply or power to the data transfer control circuit 28 is turned off by the power-supply switching circuit 18 (step S41). This facilitates a reduction in the energy consumption of the electronic instrument.

The system then determines whether or not the external power source 24 can be used, based on the VLDET signal (step S42). If the external power source 24 cannot be used, power is supplied from the rechargeable battery 26 to the USB VBUS line, through the power source switchover circuit 12 (step S43). If the external power source 24 can be used, on the other hand, power is supplied from the external power source 24 to the USB VBUS line, through the power source switchover circuit 12 (step S44). This makes it possible to charge the rechargeable battery 46 on the slave side.

Power is then supplied from the external power source 24 to the rechargeable battery 26 on the master side, through the power source switchover circuit 12 (step S45). In a similar manner to steps S17 to S19 of FIG. 7, the rechargeable battery 26 is charged with the supplied power until the charge level is at least as high as a threshold value (steps S46 to S48).

The embodiment as described above is configured in such a manner that, if the external power source 24 can be used when in charge mode, power from the external power source 24 is supplied to the electronic instrument Q on the slave side through the USB power line VBUS, instead of power from the rechargeable battery 26. This ensures that the rechargeable battery 46 on the slave side can be efficiently charged by using the external power source 24 of the electronic instrument P on the master side.

4. Data Transfer Control Circuits

Figure 11:
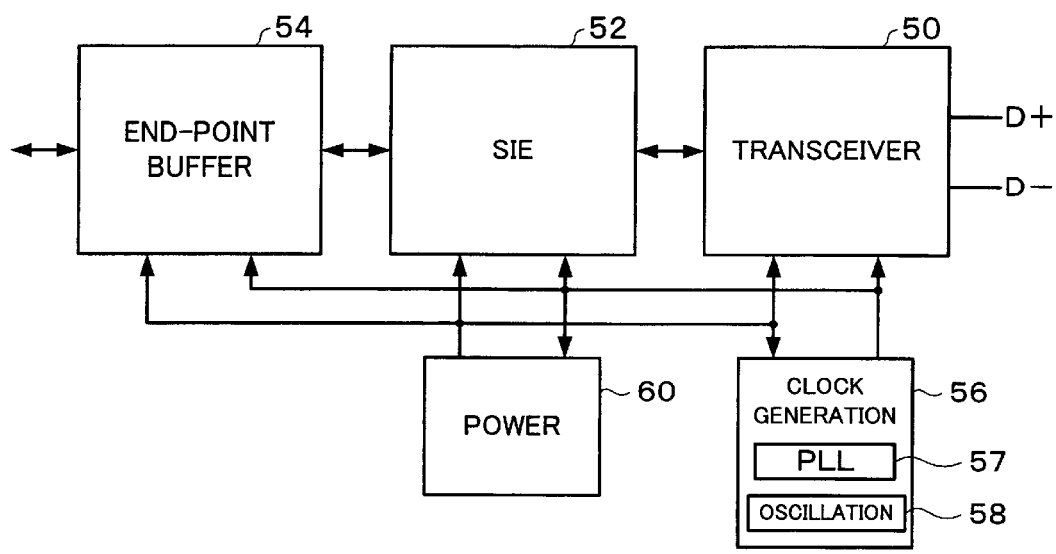
FIG. 11 shows an example of the configuration of the data transfer control circuit.

An example of the configuration of the data transfer control circuits (28 and 48 in FIG. 4) is shown in FIG. 11.

Each data transfer control circuit comprises a transceiver circuit 50, a serial interface engine (SIE) circuit 52, an end-point buffer 54, a clock generation circuit 56, and a power circuit 60. Note that not all of the circuit blocks shown in FIG. 11 are necessary for the data transfer control circuit of the present invention, and thus some of them could be omitted.

In this case, the transceiver circuit (transceiver macro) 50 is a circuit for implementing USB data transfer, comprising some of the USB physical-layer and logic-layer circuits.

More specifically the transceiver circuit 50 comprises analog front-end circuits (reception circuit and transmission circuit, not shown in the figure) for transferring data by USB, using a signal derived from the differential data lines D+ and D−. It also comprises a circuit for processing such as bit stuffing, bit unstuffing, serial-to-parallel conversion, parallel-to-serial conversion, NRZI decoding, NRZI encoding, and sampling clock generation.

The SIE circuit 52 s a circuit for performing processing relating to USB packet transfer, and it also performs various other types of processing, such as packet assembly/disassembly, CRC generation/decoding, suspend-and-resume control, and transaction management.

The end-point buffer 54 is a buffer for temporarily storing information on packets being received or transmitted, and it is configured of means such as a first-in, first-out (FIFO) register or RAM.

The clock generation circuit 56 is a circuit for generating clocks such as the operating clock used by the data transfer control circuit or the clock used for generating the sampling clock, and it comprises a phase-locked loop (PLL) 57 and an oscillation circuit 58. The PLL 57 generates the clocks (at 480 MHz and 60 MHZ, for example) necessary for various USB modes (such as HS mode and FS mode), based on a base clock generated by the oscillation circuit 58. The configuration is such that the sampling clock for data to be transferred by the data signals (D+ and D−) is generated based on the clocks generated by this PLL 57.

The power circuit 60 is a circuit that supplies a digital power source used by a digital circuit of the data transfer control circuit and an analog power source used by an analog circuit.

If the power-supply switching circuits (18 and 38) of FIG. 4 turn off the supply of power to the corresponding data transfer control circuits (28 and 48) in charge mode, the power circuit 60 of FIG. 11 turns off the supply of power to the circuit blocks within the data transfer control circuit. This makes it possible to reduce to the power consumption of the data transfer control circuit to substantially zero or an extremely small value.

Note that when the power supply is turned off, the power could be set to remain on for some of the analog circuit in the data transfer control circuit, by way of example. This would facilitate rapid startup of the circuit when the power supply is turned off then on again.

The data transfer control circuit could also be provided with an energy-saving mode when in charge mode.

This energy-saving mode could be implemented by halting the clock generation circuit 56 of FIG. 11 when in charge mode, by way of example. Alternatively, the energy-saving mode could be implemented by reducing the oscillation frequency of the PLL when in charge mode. Further alternatively, the energy-saving mode could be implemented by turning off or limiting the current flowing during charge mode in the current source comprised by the analog circuit of the data transfer control circuit.

5. Another Embodiment

Figure 12:
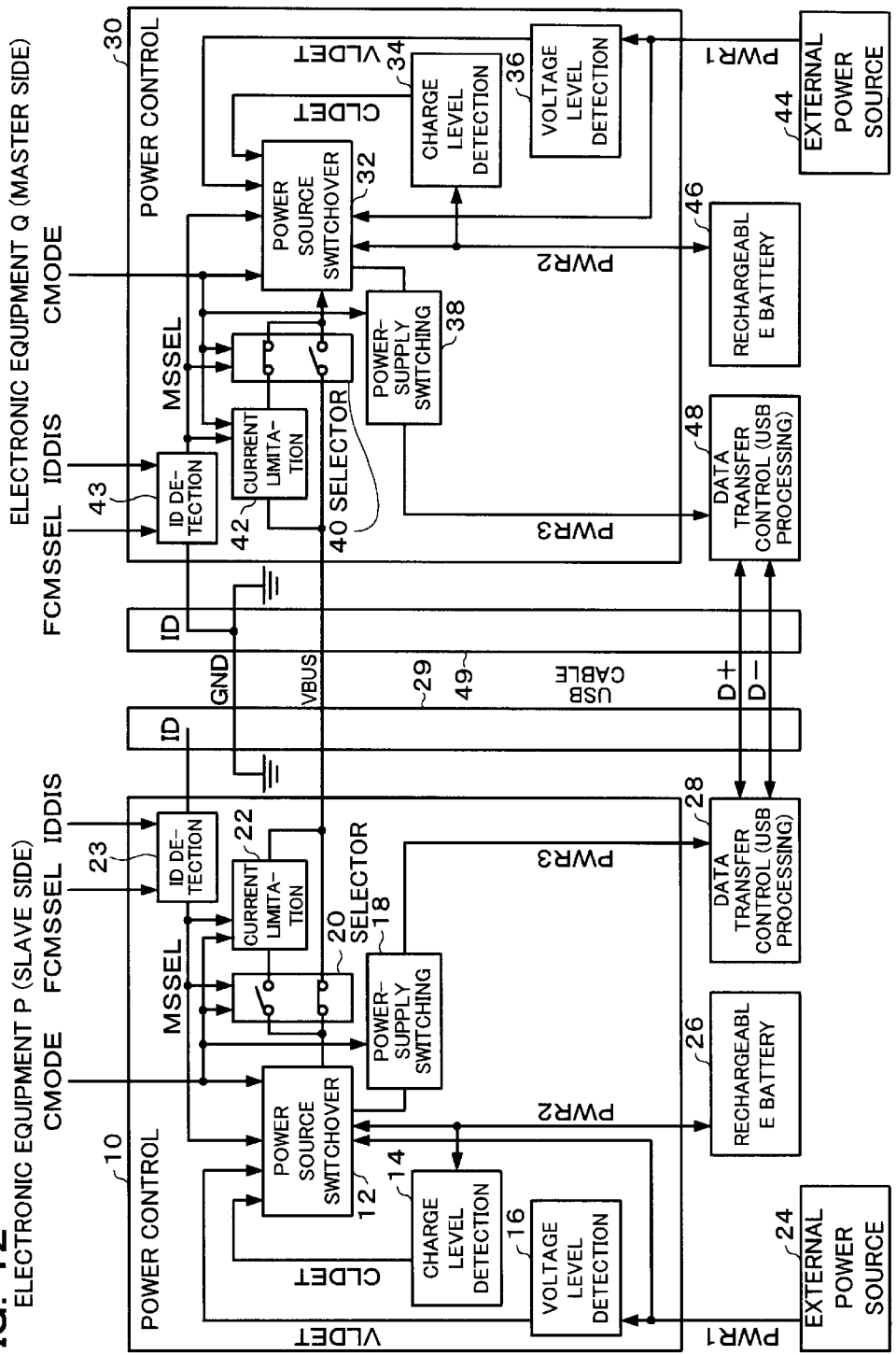
FIG. 12 is illustrative of an example of the configuration of a power control circuit and an electronic instrument in accordance with another embodiment of the present invention.

An example of the configuration of another embodiment of the power control circuit and electronic instrument is shown in FIG. 12.

The configuration of FIG. 12 differs from that of FIG. 4 in that the ID detection circuits 23 and 43 do not generate the master/slave selection signal MSSEL on the basis of the voltage level of the ID terminal alone, but also on an ID terminal invalid signal IDDIS and a master/slave forced setting signal FCMSSEL.

In other words, since the configuration of FIG. 4 relates only to charging from the master side to the slave side, it is necessary to reconnect the cable for charging, in order to define the master and slave. If the electronic instrument P was connected to the B plug of the USB cable and the electronic instrument Q was connected to the A plug, by way of example, the cable must be reconnected so that the electronic instrument P is connected to the A plug and the electronic instrument Q is connected to the B plug, so that the rechargeable battery 46 of the electronic instrument Q can be charged by the electronic instrument P. This impedes the convenience to the user.

With the configuration of FIG. 12, on the other hand, it is possible to charge the master side from the slave side without reconnecting the cable, by ensuring that the IDDIS and FCMSSEL signals have given settings.

Consider a case in which the electronic instrument P is connected to the B plug of the USB cable and the electronic instrument Q is connected to the A plug, by way of example.

In such a case, it is not possible to charge the electronic instrument Q from the electronic instrument P with the configuration of FIG. 4, without reconnecting the USB cable.

With the configuration of FIG. 12, however, the ID terminal invalid signal IDDIS is set to active and the detection of the voltage levels of the identification terminals ID by the ID detection circuits 23 and 43 is invalidated in such a case. The master/slave forced setting signal FCMSSEL is set to a certain voltage level (such as low level) on the master side in the electronic instrument P and FCMSSEL is set to a certain voltage level (such as high level) on the slave side in the electronic instrument Q.

If the IDDIS signal is inactive, the ID detection circuits 23 and 43 output the FCMSSEL signal as the MSSEL signal. This ensures that the MSSEL signal that has been set to a voltage level (such as low level) for the master side is output from the ID detection circuit 23 of the electronic instrument P and the MSSEL signal that has been set to a voltage level (such as high level) for the slave side is output from the ID detection circuit 43 of the electronic instrument Q.

As a result, the power from the electronic instrument P connected to the B plug is supplied in charge mode to the electronic instrument Q connected to the A plug, through the USB power line VBUS, making it possible to charge the rechargeable battery 46 of the electronic instrument Q. In other words, the rechargeable battery 46 of the electronic instrument Q that ought to be on the master side can be charged by the power source of the electronic instrument P that ought to be on the slave side, without reconnecting the USB cable, enhancing the convenience to the user.

Note that the setting of the IDDIS and FCMSSEL signals (generally speaking: a given setting) could be implemented by the provision of a dedicated switch such as the switch 210 of FIG. 5C, or it could be implemented by using switching means (such as an operating button or key) of the operating section that the electronic instrument is provided with. Alternatively, software means could be used for setting the IDDIS and FCMSSEL signals.

Note that the present invention is not limited to these embodiments and thus various modifications are possible within the scope of the invention laid out herein.

For example, the configurations of the power control circuit, electronic instrument, and data transfer control circuit of the present invention are not limited to the configurations shown in FIGS. 4, 11, and 12, and thus various modifications thereto are possible.

In addition, the operations of the power control circuit are not limited to those described with reference to FIGS. 6 to 10, and thus various modifications thereto are possible.

Furthermore, the power control circuit and electronic instrument in accordance with the present invention could be such as to have functions as both master and slave in USB data transfer, or they could be provided with only one of those functions.

The present invention could also be applied to standards based on a similar concept as USB, or on a standard developed from USB.

What is claimed is:

1. A power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer; and wherein when the electronic instrument has been set to the slave side for USB data transfer and has been set to charge mode, the power control circuit supplies power from the USB power line to the rechargeable battery of the electronic instrument in order to charge the rechargeable battery.

2. The power control circuit as defined by claim 1, wherein when the external power source is usable in charge mode, the power control circuit supplies power from the external power source to the rechargeable battery.

3. The power control circuit as defined by claim 1, further comprising, a current limitation circuit which restricts a maximum current of power from the USB power line in charge mode.

4. A power control circuit used in an electronic instrument that is provided with a universal serial bus (USB) interface, wherein when the electronic instrument has been set to a master side for USB data transfer and has been set to normal operating mode, the power control circuit supplies power from a rechargeable battery or power from an external power source to a data transfer control circuit which controls USB data transfer; and wherein when the electronic instrument has been set to the master side for USB data transfer and has been set to charge mode, the power control circuit supplies power from the rechargeable battery or power from the external power source to another electronic instrument on a slave side through a USB power line, in order to charge a rechargeable battery of the other electronic instrument on the slave side connected to the electronic instrument by USB.

5. The power control circuit as defined by claim 4, wherein when the external power source is usable in charge mode, the power control circuit supplies power from the external power source to the other electronic instrument on the slave side through the USB power line.

6. A power control circuit used in an electronic instrument that is provided with a universal serial bus (USB) interface, wherein when the electronic instrument has been set to a slave side for USB data transfer and has been set to normal operating mode, the power control circuit supplies power from a USB power line, power from a rechargeable battery, or power from an external power source to a data transfer control circuit which controls USB data transfer;

wherein when the electronic instrument has been set to the slave side for USB data transfer and has been set to charge mode, the power control circuit supplies power from the USB power line to the rechargeable battery of the electronic instrument in order to charge the rechargeable battery;

wherein when the electronic instrument has been set to a master side for USB data transfer and has been set to normal operating mode, the power control circuit supplies power from the rechargeable battery or power from the external power source to the data transfer control circuit which controls USB data transfer; and wherein when the electronic instrument has been set to the master side for USB data transfer and has been set to charge mode, the power control circuit supplies power from the rechargeable battery or power from the external power source to another electronic instrument on the slave side through the USB power line, in order to charge a rechargeable battery of the other electronic instrument on the slave side connected to the electronic instrument by USB.

7. The power control circuit as defined by claim 1, wherein in charge mode, supply of power to the data transfer control circuit is turned off or the data transfer control circuit is set to an energy-saving mode.

8. The power control circuit as defined by claim 4, wherein in charge mode, supply of power to the data transfer control circuit is turned off or the data transfer control circuit is set to an energy-saving mode.

9. The power control circuit as defined by claim 6, wherein in charge mode, supply of power to the data transfer control circuit is turned off or the data transfer control circuit is set to an energy-saving mode.

10. The power control circuit as defined by claim 1, wherein when a first plug of a USB cable is connected to the electronic instrument, the power control circuit determines that the electronic instrument is set to a master side, and when a second plug of the USB cable has been connected to the electronic instrument, the power control circuit determines that the electronic instrument is set to the slave side.

11. The power control circuit as defined by claim 4,
wherein when a first plug of a USB cable is connected to the electronic instrument, the power control circuit determines that the electronic instrument is set to the master side, and when a second plug of the USB cable has been connected to the electronic instrument, the power control circuit determines that the electronic instrument is set to the slave side.

12. The power control circuit as defined by claim 6,
wherein when a first plug of a USB cable is connected to the electronic instrument, the power control circuit determines that the electronic instrument is set to the master side, and when a second plug of the USB cable has been connected to the electronic instrument, the power control circuit determines that the electronic instrument is set to the slave side.

13. The power control circuit as defined by claim 10,
wherein each of the first and second plugs of the USB cable has an identification terminal for identifying the master side or the slave side; and
wherein the power control circuit determines whether the electronic instrument has been set to the master side or the slave side, by detecting a voltage level of the identification terminal when the electronic instrument is connected to one of the first and second plugs of the USB cable.

14. The power control circuit as defined by claim 11,
wherein each of the first and second plugs of the USB cable has an identification terminal for identifying the master side or the slave side; and
wherein the power control circuit determines whether the electronic instrument has been set to the master side or the slave side, by detecting a voltage level of the identification terminal when the electronic instrument is connected to one of the first and second plugs of the USB cable.

15. The power control circuit as defined by claim 12,
wherein each of the first and second plugs of the USB cable has an identification terminal for identifying the master side or the slave side; and
wherein the power control circuit determines whether the electronic instrument has been set to the master side or the slave side, by detecting a voltage level of the identification terminal when the electronic instrument is connected to one of the first and second plugs of the USB cable.

16. The power control circuit as defined by claim 10,
wherein when an electronic instrument connected to the first plug of the USB cable is forcibly set to the slave side and another electronic instrument connected to the second plug of the USB cable is forcibly set to the master side, power from the other electronic instrument connected to the second plug is supplied through the USB power line to the electronic instrument connected to the first plug, to charge a rechargeable battery of the electronic instrument connected to the first plug.

17. The power control circuit as defined by claim 11,
wherein when an electronic instrument connected to the first plug of the USB cable is forcibly set to the slave side and another electronic instrument connected to the second plug of the USB cable is forcibly set to the master side, power from the other electronic instrument connected to the second plug is supplied through the USB power line to the electronic instrument connected to the first plug, to charge a rechargeable battery of the electronic instrument connected to the first plug.

18. The power control circuit as defined by claim 12,
wherein when an electronic instrument connected to the first plug of the USB cable is forcibly set to the slave side and another electronic instrument connected to the second plug of the USB cable is forcibly set to the master side, power from the other electronic instrument connected to the second plug is supplied through the USB power line to the electronic instrument connected to the first plug, to charge a rechargeable battery of the electronic instrument connected to the first plug.

19. An electronic instrument comprising:
the power control circuit defined by claim 1;
a rechargeable battery in which charging thereof is controlled by the power control circuit; and
a data transfer control circuit which controls USB data transfer.

20. An electronic instrument comprising:
the power control circuit defined by claim 4;
a rechargeable battery in which charging thereof is controlled by the power control circuit; and
a data transfer control circuit which controls USB data transfer.

21. An electronic instrument comprising:
the power control circuit defined by claim 6;
a rechargeable battery in which charging thereof is controlled by the power control circuit; and
a data transfer control circuit which controls USB data transfer.

22. A charging method for an electronic instrument that is provided with a universal serial bus (USB) interface, comprising:
supplying power from a first electronic instrument on a master side through a USB power line to a second electronic instrument on a slave side and charging a rechargeable battery of the second electronic instrument, when the first electronic instrument has been connected to a first plug of a USB cable and is set to the master side and the second electronic instrument has been connected to a second plug of the USB cable and is set to the slave side; and
supplying power from the second electronic instrument on the master side through the USB power line to the first electronic instrument on the slave side and charging a rechargeable battery of the first electronic instrument, when the first electronic instrument has been connected to the second plug of the USB cable and is set to the slave side and the second electronic instrument has been connected to the first plug of the USB cable and is set to the master side.

23. The charging method defined by claim 22, further comprising:
turning off a supply of power to the data transfer control circuit which controls USB data transfer, or setting the data transfer control circuit to an energy-saving mode, in charge mode.

24. The charging method defined by claim 22, further comprising:
supplying power to an electronic instrument connected to the first plug from another electronic instrument connected to the second plug through the USB power line, and charging a rechargeable battery of the electronic instrument connected to the first plug, when the electronic instrument connected to the first plug of the USB cable is forcibly set to the slave side and the other electronic instrument connected to the second plug of the USB cable is forcibly set to the master side.

* * * * *